United States Patent [19]

Kyokuichi et al.

[11] Patent Number: 4,790,449
[45] Date of Patent: Dec. 13, 1988

[54] SAFETY PLASTIC FILLER NECK CAP

[75] Inventors: Sato Kyokuichi; Kayatani Tooru, both of Soja, Japan

[73] Assignee: OM Industrial Co., Ltd., Okayama, Japan

[21] Appl. No.: 173,061

[22] Filed: Mar. 24, 1988

[30] Foreign Application Priority Data

Jan. 16, 1988 [JP] Japan .................................. 63-7113

[51] Int. Cl.$^4$ ............................................. B65D 41/04
[52] U.S. Cl. ............................... 220/288; 220/DIG. 33
[58] Field of Search ............... 220/288, 203, 303, 304, 220/DIG. 33

[56] References Cited

U.S. PATENT DOCUMENTS

| | | | |
|---|---|---|---|
| 4,337,873 | 7/1982 | Johnson | 220/204 |
| 4,458,823 | 7/1984 | Baker | 220/288 |
| 4,458,824 | 7/1984 | Baker et al. | 220/288 |
| 4,494,673 | 1/1985 | Hiraishi | 220/288 |
| 4,678,097 | 7/1987 | Crute | 220/288 |
| 4,690,293 | 9/1987 | Uranishi et al. | 220/DIG. 33 |

Primary Examiner—George T. Hall
Attorney, Agent, or Firm—Koda and Androlia

[57] ABSTRACT

In a filler neck cap including a screw body and a cap, the cap comprises two members of a cover portion and an annular thin latching member so as to enable different materials, each of which exercise optimumly functions necessary to the respective members. In one example with respect to a combination of preferred materials, the cover portion of the cap and the screw body may be formed from polyacetal resin, but the annular thin latching member interposed therebetween may be formed from polyamide resin; the safety plastic filler neck cap may be manufactured from the combination of these synthetic resins, which is designed to be capable of controlling the screwing torque and of stabilizing the cap dislodgement. According to the present invention, there can be provided the comfortably operable filler neck cap increasing the dimensional stability of the cap and eliminating the grating noise during the cap opening-closing operations.

1 Claim, 3 Drawing Sheets

SAFETY PLASTIC FILLER NECK CAP

BACKGROUND OF THE INVENTION

1. Field of the Invention

The present invention relates to a filler neck cap for automobiles or the like and, more particularly, to an improved safety plastic filler neck cap which is developed for the purpose of further increasing the stability in function, i.e., to control the torque during screwing and to prevent fuel leakage from the filler neck port caused by the separation of the cap upon receiving an impact, with respect to the known screw-type plastic cap precedingly proposed by U.S. Pat. No. 4,494,673 which has been assigned to the applicant of the present invention.

2. Description of the Prior Art

In the conventional filler neck caps for automobiles or the like, a screw body to be threadably fitted into the fuel supplying port is generally unitedly assembled with a cap being positioned on its operating side or on the side of a handgrip cover portion through a ratchet mechanism enabling them to favorably control the opening-closing torque. Usually, the screw body and the cap are made from different materials. In this connection, polyamide resin, etc. is ordinarily used for the cap and, on the contrary, polyacetal resin, etc. is often utilized for the screw body. This results from the requisites for the particular cap components; and they should, of course, be formed from optimum plastic materials. Generally speaking, oil resistance and water resistance are required for the screw body, whereas the cap should satisfy common essential properties, such as ready manipulation, weather-proofing, antishock and the like.

Then, polyamide resin which has been every so often used for the cap has a higher water absorption than polyacetal resin, etc. and, therefore, it entails problems concerning a lack of stability in dimension. Thus when the combination for the selected different plastic materials is chosen the safety filler neck cap, which includes the function controlling the torque during screwing it into the fuel supplying tube as well as the function preventing fuel leakage from the filler neck port caused by the separation of the cap upon receipt an impact force, the torque in screwing and the releasing action vary to cause the functions of the cap to become unstable due to seasonal variation in temperature and humidity. There exists a problem that each component in the cap has to be manufactured highly precisely within high parameters of accuracy for practical use. For the above reasons, an attempt has been made to substitute the materials used for the screw body and the cap with a common material such as polyacetal resin or the like having substantially no water absorption, but the latch and the latch teeth wear more rapidly than in the case of a combination of different materials. Thus, the life span of the cap is shortened; and the cap will produce a grating noise causing the user to feel uncomfortable. Although these defects have not been solved hitherto, it is the present procedure to apply a combination of different materials in the manufacturing.

In the conventional plastic filler neck cap, a measure taken to unitedly assemble the latches with the latch teeth provided interposingly between the cap and the screw body to control the clamping torque has been disclosed, for example, in U.S. Pat. No. 4,458,823 and U.S. Pat. No. 4,458,824. However, these patents have been developed mainly for the purpose of resolving conventional problems during the molding; thus the purposes of the patents do not reside in accomplishment of controlling the rotational torque by the substitution of material and of protecting the components from breakage by instantaneous separation upon receiving an impact force. The construction of the filler neck cap according to the present invention can be thus clearly differentiated from those disclosed in the patents.

SUMMARY OF THE INVENTION

As the result of various studies, the inventors of the present invention have concluded that the prior U.S. Pat. No. 4,494,673 can accomplish further improvements in the capabilities, that is, to control the torque and to dislodge the cap cover when an impact force is applied. The present invention has made the above conclusion concrete, having a structure described below.

According to the structure of the present invention, in a plastic filler neck cap wherein a screw body to be threadably fitted into the fuel supplying port and a cap being positioned on the hand grip operating side are unitedly assembled with each other in opening-closing torque controllable manner, this plastic filler neck cap is characterized in that it comprises a cover portion and an annular thin latching member, and there is provided between the cover portion and the latching member a whirlstop of a plurality of concavo-convex coupling portions, and that the latches provided on the inner periphery of the cover portion and the latching teeth portion are of different plastic materials.

In addition to the above-mentioned characterized structure, there are also provided tongue-like guides extending upwardly from the inner side wall of the latching member and engageable receiving surfaces for the tongue-like guides defined within the handle space of the corresponding cover portion, thereby facilitating ready positioning and guiding of the latching member and the cover portion when they are being unitedly assembled, such as shown in the right-hand cross-sectional view of FIG. 1, and at the same time, securely assembling them while a plurality of concavo-convex coupling portions are being tightly fitted with one another.

As described previously, the present invention is characterized in that the cap is divided into the cover portion and the annular thin latching member, and that the materials used for making the cover portion of the cap itself and the latching member are made different from each other. That is to say, when polyacetal resin, etc., is used for the cover portion, dimensional stability can be assured since the cap of polyacetal resin, etc., has no water absorption unlike the cap of only polyamide resin. When material such as polyamide resin is replaced with polyacetal resin, etc., to manufacture the latching member, the variation in dimension due to the water absorption becomes slight, because of its lesser thickness, so that the torque balance is stabilized, while the grating noise between the latches and the latching teeth is almost eliminated since the different materials have been selectively employed. Accordingly, a choice in optimum plastic materials can be freely made corresponding to the necessary functions of the respective components.

Furthermore, a plurality of the concavo-convex coupling portions provided interposing between the cover portion and the latching member serve to rigidly stop the rotation between them during the rotational opening or closing operation of the cap, although the cap is divided into two members. This way is conspicuously advantageous in comparison with an attempt at restricting the relative motion between the cover portion and the latching member by means of press-fit contact between them through elastic projections and complementary grooves made from plastic resin.

DETAILED DESCRIPTION OF THE INVENTION

A safety plastic filler neck cap for automobiles or the like according to the present in fully described concretely hereinafter with reference to the drawings showing preferred embodiments.

As can clearly be understood from these drawings, the filler neck cap of the present invention is a plastic filler neck cap having a structure such that a screw body 1 threadably fitted into a fuel supplying port of such filler neck as previously described is unitedly assembled with a cap 2 being positioned on the handgrip operating side, in opening-closing torque controllable manner, and that the cap 2 comprises a cover portion 2a with a handle and an annular thin latching member 2b adapted to be fitted into this cover portion.

Figure 1:
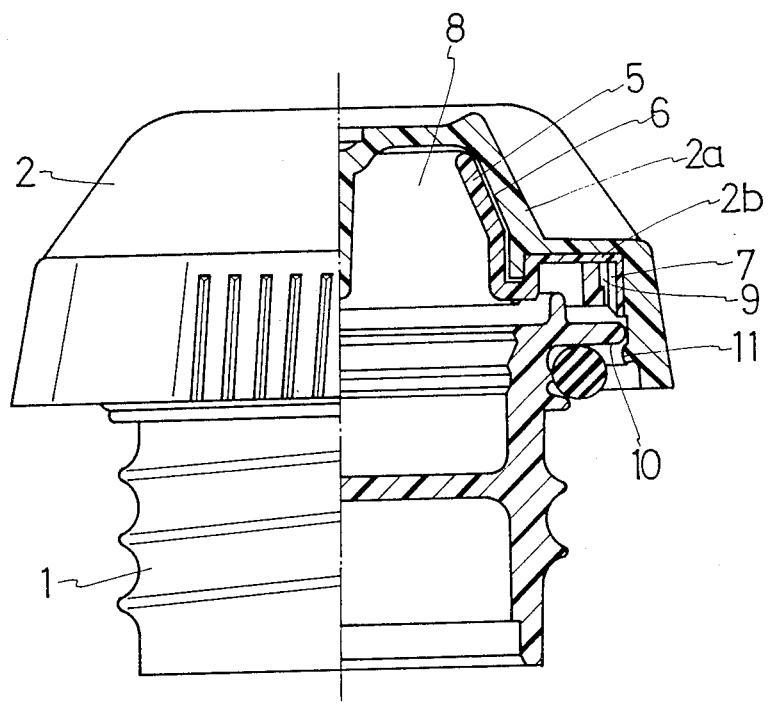
FIG. 1 is a partially cutaway front view of a safety plastic filler neck cap according to the present invention.

In one embodiment shown in FIG. 1, it can be seen that the screw body 1 and the cap 2 are engaged with each other by means of a flange 10 of the screw body 1 and engaging/disengaging teeth 11 of the cap 2, and that this assembly has such a structure that, when the cap has been subjected to excessive impact force, only the screw body 1 remains on the fuel supplying port of the filler neck while the engaging/disengaging teeth 11 on the side of cap 2 are released from the flange 10 on the side of screw body 1, allowing only the cap to be dislodged from the screw body the cap is dislodged from the screw body.

The opening-closing torque controlling functions can be obtained by a mechanism in which ratchets 7 provided around the inner periphery within the annular latching member 2b will engage with projections 9 which extend from the upper portion of the flange in spaced relation to one another.

Figure 2:
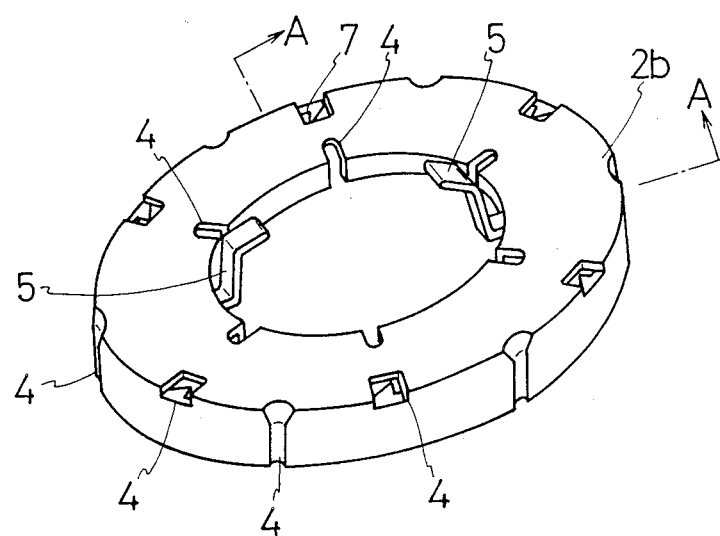
FIG. 2 is a perspective view of a latching member constituting one of two members into which a cap is divided.
Figure 3:
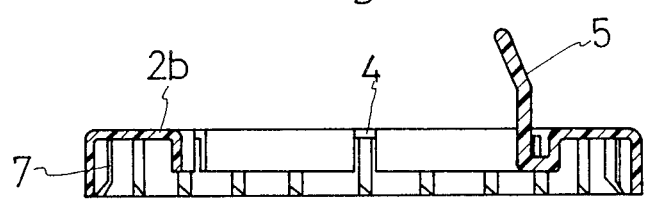
FIG. 3 is a cross-sectional view of the latching member along the line A—A in FIG. 2.
Figure 4:
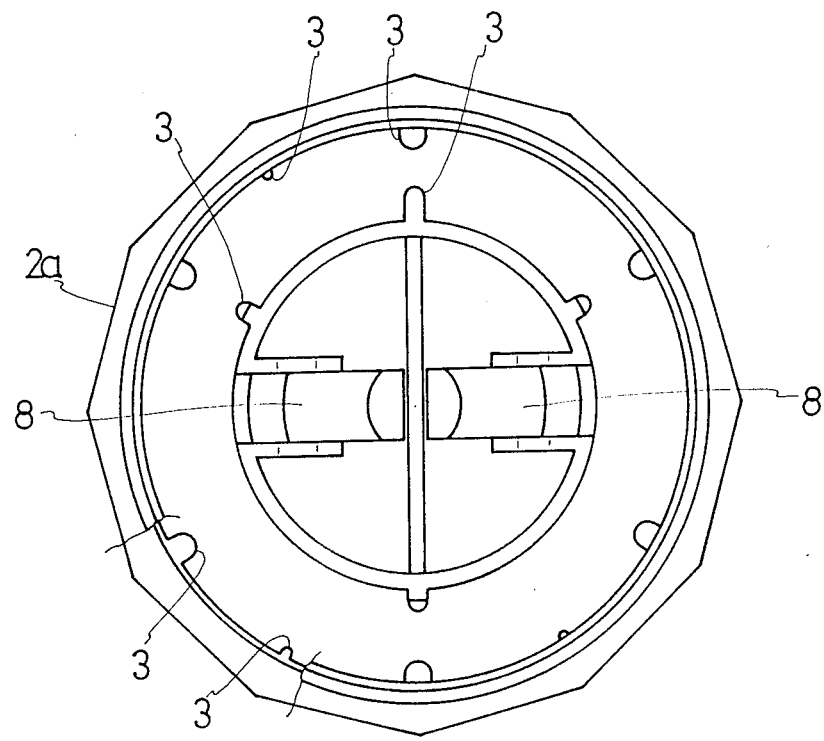
FIG. 4 is a bottom view of a cover portion constituting the other of two members into which the cap is divided.
Figure 5:
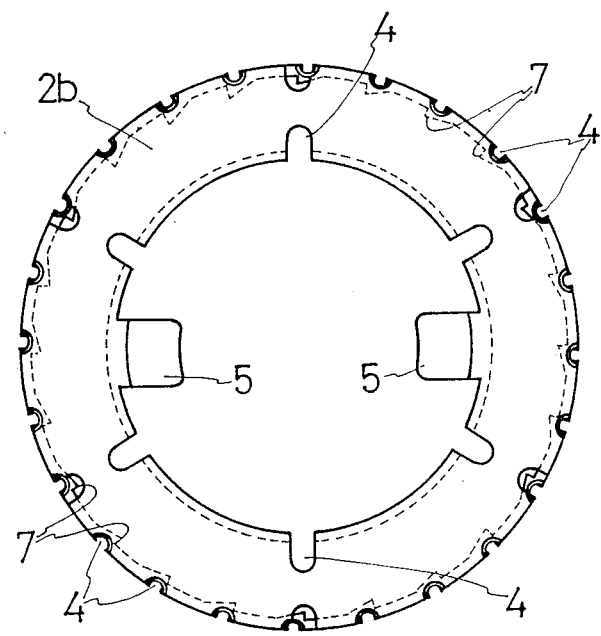
FIG. 5 shows a modified latching member.

The details of the latching member 2b are illustrated in FIGS. 2, 3 and 5. In the drawings, there can appear mating recesses 4 at the inner and outer circumferences of this annular latching member as well as ratchets 7 within such recesses engageable with the projections 9 on the cap 1, and also tongue-like guides 5 extending upwardly from the inner side wall of the latching member. The mating recesses 4 are fitted into complementary convexes 3 provided on the periphery of the cover portion 2a so that they cooperate with one another to serve as a whirl-stop between the cover portion and the latching member.

Although, in FIG. 2, some of the mating recesses 4 are spacedly provided along the outer periphery of the latching member 2b, it is preferable to define those mating recesses at the locations the inside of which the ratchets 7 exist, such as shown in FIG. 5, in order to eliminate the non-uniformity in thickness on the peripheral wall of the latching member, improve stability in dimension by withstanding the water absorption, and further decrease residual strain originated from the molding process. Thus the whirl-stop effect is securely reliable. The tonguelike guides 5 of the latching member 2b will enter into the space 8 of the handle provided on the cover portion 2a so that such a space facilitates ready positioning of the latching member with respect to the cap portion when they are connected together.

As has been described in the above, the filler neck cap according to the present invention incorporates an improved structure so that the cap 2 comprises two parts consisting of the cover portion 2a and the latching member 2b, the wall portion of the latching member being decreased in thickness; and the cover portion 2a is rigidly united with the latching member by means of the concavo-convex coupling portions such as grooves and ridges and, accordingly, filler neck cap possesses the following features:

The cover portion 2a being positioned on the operating side of the cap 2 may be manufactured, for example, from polyacetal resin, which has been also commonly used for making conventional type caps, to advantageously reserve the required inherent characteristics of such resin which are useful for the cap, whereas the thin latching member 2b may be made from materials such as polyamide resin, which differs from polyacetal resin used for the cover portion, so as to increase the dimensional stability for the whole body of the cap. Further, because the cap 2 comprises two members, when polyacetal resin or the like, having suitable dimensional stability is used to form the cover portion 2a, the strength against disconnection between these two parts is maintained substantially constant.

Alternatively, a low cost material, for example, polyethylene may be used for the cover portion 2a in order to realize cost reduction and, at the same time, high class materials, such as high grade polyamide resin may be utilized to mold the latch member 2b within the intended or projected total cost to be intended. When those two synthetic materials have been employed, the operating torque is further stabilized, without an increase in manufacturing cost, and improves the quality of the finished articles. The above-mentioned different materials include not only various substances having different chemical compositions, but also a number of plastic materials each having different physical property, i.e., many plastic materials of different grades and of the same kinds. In this connection, the object of the present invention will also be accomplished even if the cover portion 2a and the latching member 2b are manufactured from nylon #12 and nylon #6, respectively.

The latching member 2b is of a structure having the thin wall and, consequently, even if the material of the latching member is water-absorptive, such water absorption is substantially uniformly spread over the latching member so as to totally reduce the strain of the cap. Then, since the latching member 2b is received within the handle space of the cover portion 2a, simultaneously assembling of three members, i.e., the cap 1, the cover portion 2a and the latching member 2b can be easily conducted by one-touch operation without making particular positioning. In addition, the above-mentioned structure according to the present invention will exercise the capabilities of giving not only the high mechanical strength to the filler neck cap at the time of attachment or removement of it, but also of reducing the wear and substantially eliminating the grating noise, thereby allowing the operation by the user to be smoothly carried out.

What is claimed is:

1. A plastic filler neck cap for automobiles or the like wherein a screw body to be threadably fitted into the fuel supplying port and a cap being positioned on the handgrip operating side are unitedly assembled with each other in opening-closing torque controllable manner, characterized in that the cap comprises two members of a cover portion and an annular thin latching member both made from different materials, and that there is provided between said two members of the cover portion and latching member a whirl-stop of a plurality of concavo-convex coupling portions to unitedly assemble said two members.

* * * * *